3,822,324
ISOMERISATION PROCESS
Peter John Nicholas Brown, Epsom Downs, England, assignor to BP Chemicals Limited, London, England
No Drawing. Filed May 26, 1971, Ser. No. 147,199
Claims priority, application Great Britain, June 30, 1970, 31,545/70
Int. Cl. C07c 21/04
U.S. Cl. 260—654 R  7 Claims

ABSTRACT OF THE DISCLOSURE

Dichlorobutenes are isomerised by contacting them with a catalyst composition comprising copper naphthenate and an ortho- or a para-nitroaniline.

---

The present invention relates to a process for the preparation of 3,4-dichlorobutene-1 by the isomerisation of 1,4-dichlorobutene-2 or 1,4-dichlorobutene-2 by the isomerisation of 3,4-dichlorobutene-1.

The dichlorobutene obtained by the chlorination of butadiene is a mixture of the isomeric compounds 1,4-dichlorobutene-2 and 3,4-dichlorobutene-1, comprising approximately 60% of the former and about 40% of the latter. These two isomers usually exist in equilibrium in the mixture, the proportion depending on the conditions of preparation.

The usual methods of isomerising 1,4-dichlorobutene-2 to 3,4-dichlorobutene-1 or 3,4-dichlorobutene-1 to 1,4-dichlorobutene-2 consist of heating the mixed isomers with one or more of copper, iron, zinc, titanium, aluminium, zirconium etc., metal salts as catalysts or heating the isomers in the absence of catalysts. Whichever process is used for the isomerisation, the rate of conversion is undesirably slow and to obtain useful yields of the right isomer high temperatures are required which give rise to some unwanted by-products.

It has been found that the use of a specific catalyst composition appreciably accelerates the rate of the isomerisation reactions.

According to the present invention a process for the isomerisation of 1,4-dichlorobutene-2 to 3,4 - dichlorobutene-1 or for the isomerisation of 3,4-dichlorobutene-1 to 1,4-dichlorobutene-2 comprises contacting the compound to be isomerised with a catalyst composition comprising copper naphthenate in combination with ortho- or para-nitroanilines.

The nitroanilines in the catalyst composition may be further substituted by alkyl group in the aromatic nuclear positions. Typical alkyl substituents are groups containing 1–10 carbon atoms which are exemplified in Table 2 with nuclear methyl substituted nitroanilines.

The amount of the nitroaniline present in the catalyst composition may vary over a moderately wide range of between 0.5 and 10% by weight of the total composition consisting of catalyst and dichlorobutene.

The isomerisation reaction of the present invention may be carried out between temperatures of 80° and 160° C. preferably between 100 and 130° C. at atmospheric super-atmospheric or sub-atmospheric pressures.

The process of the present invention may be performed by using a batch process or a continuous process. It is preferable to carry out the process continuously. If it is desired to convert 1,4-dichlorobutene-2 to 3,4-dichlorobutene-1, the former or the direct chlorination product of butadiene previously described and preferably freed from high boilers is fed continuously to a reactor which contains the catalyst. This is heated and pure 3,4-dichlorobutene-1 distilled off through a fractionating column. The apparatus is preferably maintained under reduced pressure because it is neither necessary nor desirable to conduct the reaction at the normal boiling point of the dichlorobutenes. Distillation can thus take place from the reactor itself. Since 3,4-dichlorobutene-1 has a lower boiling point than 1,4-dichlorobutene-2 the equilibrium of the reaction is displaced in favour of the former and all the 1,4-dichlorobutene-2 which is fed to maintain a constant level in the reactor, is thus converted to 3,4-dichlorobutene-1. It should be noted that there is no loss of catalyst in the 3,4-dichlorobutene-1 distilled off. However, since a very small proportion of the dichlorobutenes is converted to high boilers, it is necessary to remove a small stream from the reactor as liquid to prevent accumulation of the high boilers. This stream is subjected to separate distillation to recover the dichlorobutene content which is then recycled to the reactor. In this operation the catalyst is left in the higher boiler stream and so a very small make-up of catalyst has, in practice, to be added to the reactor. This should be sufficient to maintain the preferred reaction rate.

In the alternative case, where it is desired to convert 3,4-dichlorobutene-1 to 1,4-dichlorobutene-2, the mixed dichlorobutenes are again fed to a continuous reactor system as previously described but in this case, in order to separate the 1,4-dichlorobutene-2 a liquid stream is fed from the reactor to the appropriate point near the base of the fractionating column, not attached to the reactor, and provided with its own reboiler. 3,4-Dichlorobutene-1 is removed from the head of the column and recycled back to the reactor and 1,4-dichlorobutene-2 vapour removed near the base of the column but below the feed point. The catalyst containing stream from the reboiler of the column is returned to the reactor, a suitable proportion being removed for separate distillation, to prevent accumulation of high boilers in the reactor. A regular addition of catalyst to the reactor is necessary to replace that which is removed in the high boiler stream and to maintain the reaction rate.

The process of the present invention is further illustrated by the following examples.

EXAMPLES

Cupric naphthenate (3 parts of a commercial product containing 5% w./w. Cu metal) and 3 parts of an additive shown in Tables 1 and 2 were added to 1,4-dichlorobutene-2 (100 parts). The mixture was heated very quickly to 120° C. and, at various times, samples were removed and analysed by gas phase chromatography. From the plot of conversion of 3,4-dichlorobutene-1 against time, R (the time (min.) taken to attain 10% conversion to 3,4-dichlorobutene-1) was measured.

A control isomerisation not according to the invention of 1,4-dichlorobutene-2 (100 parts) with the addition of only cupric naphthenate (3 parts) was conducted simultaneously in the same way. From the plot of conversion to 3,4-dichlorobutene-1 against time, C (the time (min.) taken to attain 10% conversion to 3,4-dichlorobutene-1) was measured.

The results of these experiments are shown in Tables 1 and 2.

TABLE 1

| Catalyst | Additive | $\dfrac{C}{R}$ | C–R (min.) |
|---|---|---|---|
| Cupric naphthenate | Para-nitroaniline | 3.86 | +20 |
| Do | Ortho-nitroaniline | 1.33 | +9 |
| Do | None | 1.00 | 0 |

TABLE 2

| Catalyst | Additive | C/R | C-R (min.) |
|---|---|---|---|
| Cupric naphthenate | 2-methyl-5-nitroaniline | 6.00 | +50 |
| Do | 4-methyl-2-nitroaniline | 3.65 | +34.5 |
| Do | 2-methyl-4-nitroaniline | 2.62 | +27.5 |

I claim:

1. A process for the isomerisation of 1,4 - dichlorobutene-2 to 3,4-dichlorobutene-1 or for the isomerisation of 3,4-dichlorobutene-1 to 1,4 - dichlorobutene-2, which comprises contacting in the liquid phase at a temperature in the range of 80° to 160° C. the compound to be isomerised with a catalyst composition comprising copper naphthenate and ortho-nitroaniline, paranitroaniline, or a nuclear methyl substituted nitroaniline containing no other substituents, and separting and recovering the desired product from the reaction mixture.

2. A process according to claim 1 wherein the catalyst composition comprises copper naphthenate and ortho-nitroaniline.

3. A process according to claim 1 wherein the catalyst composition comprises copper naphthenate and para-nitroaniline.

4. A process according to claim 1 wherein the nitroaniline is present in an amount of between 0.5 and 10% by weight baed on the total weight of dichlorobutenes and catalyst present in the reaction mixture.

5. A process as defined in claim 1, wherein the nitroaniline is 2-methyl-5-nitroaniline.

6. A process as defined in claim 1, wherein the nitroaniline is 4-methyl-2-nitroaniline.

7. A process as defined in claim 1, wherein the nitroaniline is 2-methyl-4-nitroaniline.

References Cited

UNITED STATES PATENTS 2,446,475   8/1942   Hearne et al. _____ 260—654 R

FOREIGN PATENTS 798,889   7/1958   Great Britain _____ 260—654 R
800,787   9/1958   Great Britain _____ 260—654 R
1,802,385   11/1969   Germany _____ 260—654 R LEON ZITVER, Primary Examiner J. A. BOSKA, Assistant Examiner